United States Patent
Sato et al.

(10) Patent No.: US 8,159,526 B2
(45) Date of Patent: Apr. 17, 2012

(54) STEREOSCOPIC IMAGE DISPLAY SYSTEM

(75) Inventors: Shigemi Sato, Asahi-mura (JP); Akira Kubota, Matsumoto (JP); Tomio Sonehara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1814 days.

(21) Appl. No.: 11/221,761

(22) Filed: Sep. 9, 2005

(65) Prior Publication Data

US 2006/0061652 A1  Mar. 23, 2006

(30) Foreign Application Priority Data

Sep. 17, 2004 (JP) ................................. 2004-271510
Sep. 17, 2004 (JP) ................................. 2004-271511

(51) Int. Cl.
*H04N 13/00* (2006.01)
*H04N 13/04* (2006.01)
*B25J 19/00* (2006.01)

(52) U.S. Cl. ........ 348/51; 348/42; 348/53; 348/E13.008

(58) Field of Classification Search .............. 348/42–60, 348/744, E13.001, E9.025, E13.023, E13.036, 348/E13.045; 359/515, 529, 376–378, 458, 359/470, 462–467, 196.1; 342/180; 396/324; 356/12

See application file for complete search history.

(56) References Cited

U.S. PATENT DOCUMENTS

| | | | | |
|---|---|---|---|---|
| 4,870,600 A | * | 9/1989 | Hiraoka | 345/419 |
| 5,264,964 A | * | 11/1993 | Faris | 359/465 |
| 5,349,379 A | * | 9/1994 | Eichenlaub | 348/59 |
| 6,157,382 A | * | 12/2000 | Ohshima et al. | 345/419 |
| 6,429,867 B1 | * | 8/2002 | Deering | 345/423 |
| 6,496,218 B2 | * | 12/2002 | Takigawa et al. | 348/42 |
| 7,190,518 B1 | * | 3/2007 | Kleinberger et al. | 359/465 |
| 7,253,791 B2 | * | 8/2007 | Kahan et al. | 345/8 |
| 2010/0085424 A1 | * | 4/2010 | Kane et al. | 348/53 |

FOREIGN PATENT DOCUMENTS

| | | | |
|---|---|---|---|
| JP | A-63-310086 | | 12/1988 |
| JP | 08111876 A | * | 4/1996 |
| JP | 11075223 A | * | 3/1999 |
| JP | A-11-084313 | | 3/1999 |
| JP | A-2000-347132 | | 12/2000 |
| JP | A 2001-296501 | | 10/2001 |
| JP | A-2004-012626 | | 1/2004 |
| JP | A-2004-096224 | | 3/2004 |

\* cited by examiner

*Primary Examiner* — Twyler Haskins
*Assistant Examiner* — Chad Dickerson
(74) *Attorney, Agent, or Firm* — Oliff & Berridge, PLC

(57) ABSTRACT

A stereoscopic image display system includes: an image display unit that displays a parallax image composed of a right eye image and a left eye image; glasses having a transmission portion for a right eye transmitting only the right eye image of the parallax image and a transmission portion for a left eye transmitting only the left eye image of the parallax image; an inclination detection unit that detects an inclination of the glasses; a parallax image generation unit that generates the parallax image in accordance with a detection result from the inclination detection unit; and a display unit that displays the parallax image generated by the parallax image generation unit.

8 Claims, 10 Drawing Sheets

FIG.1
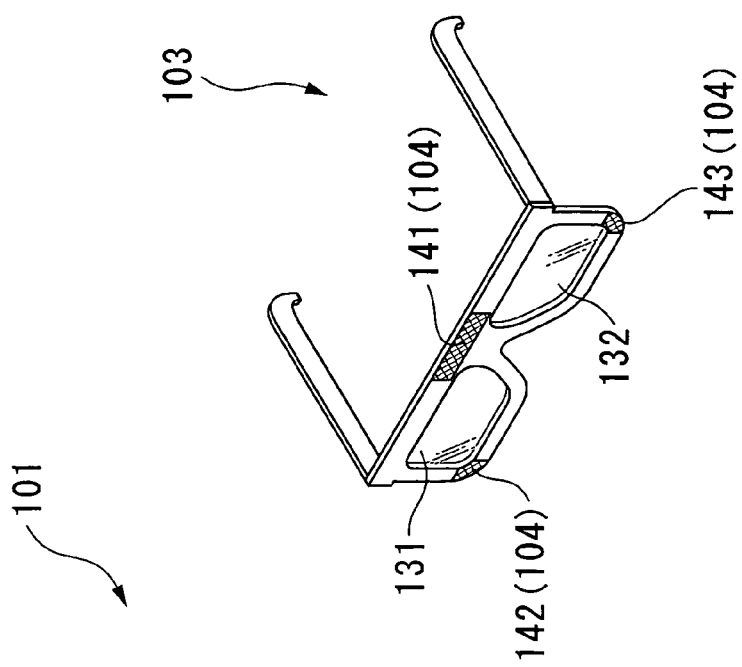
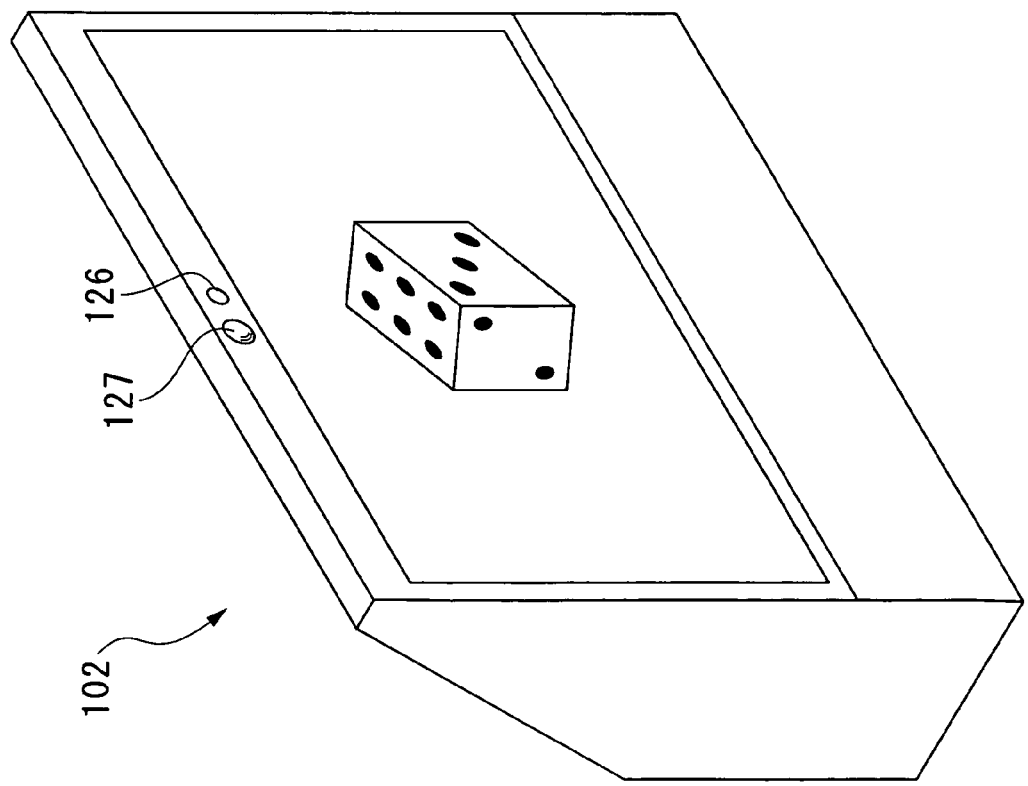

RIGHT EYE IMAGE

LEFT EYE IMAGE

RIGHT EYE IMAGE

LEFT EYE IMAGE

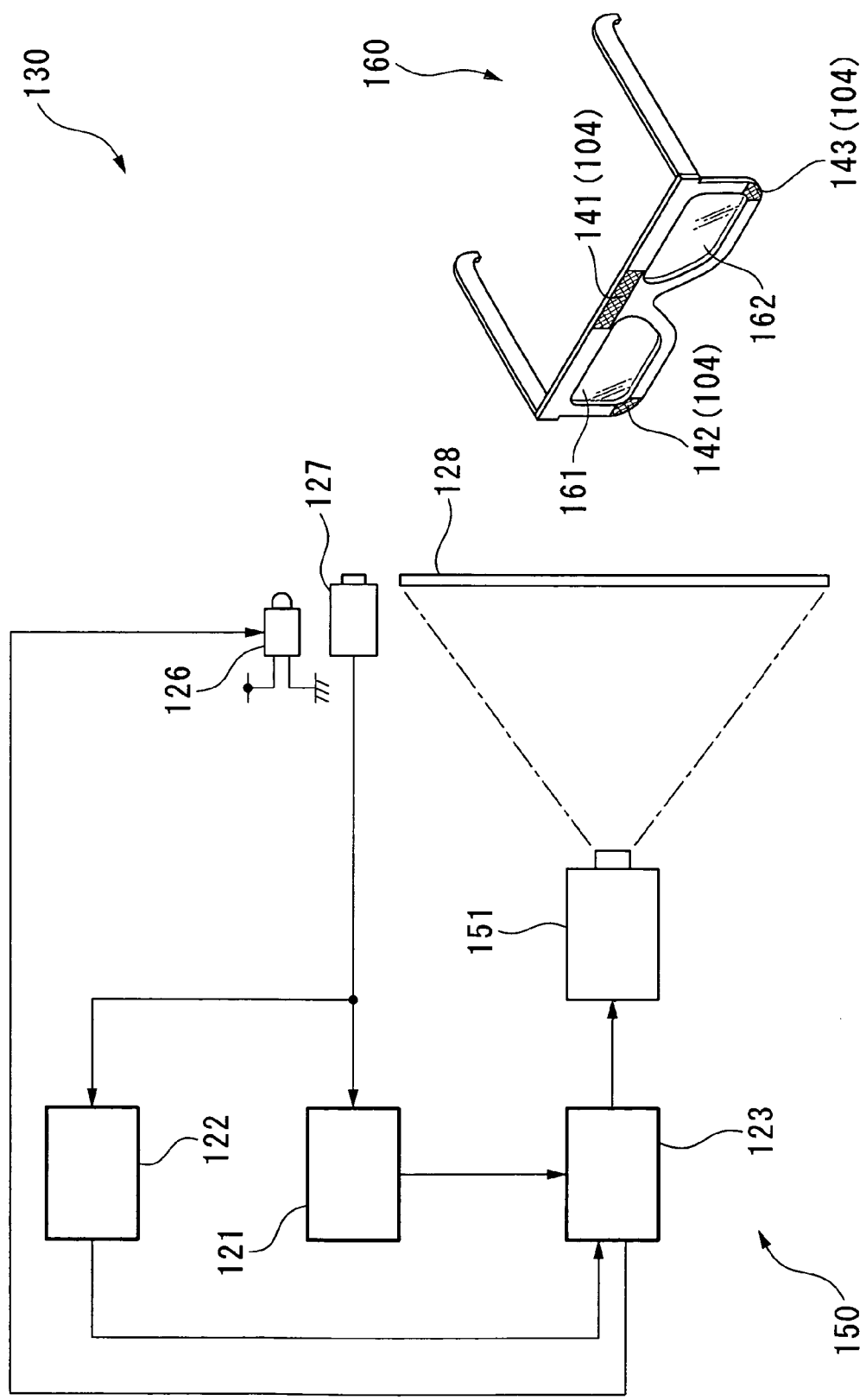

FIG.10
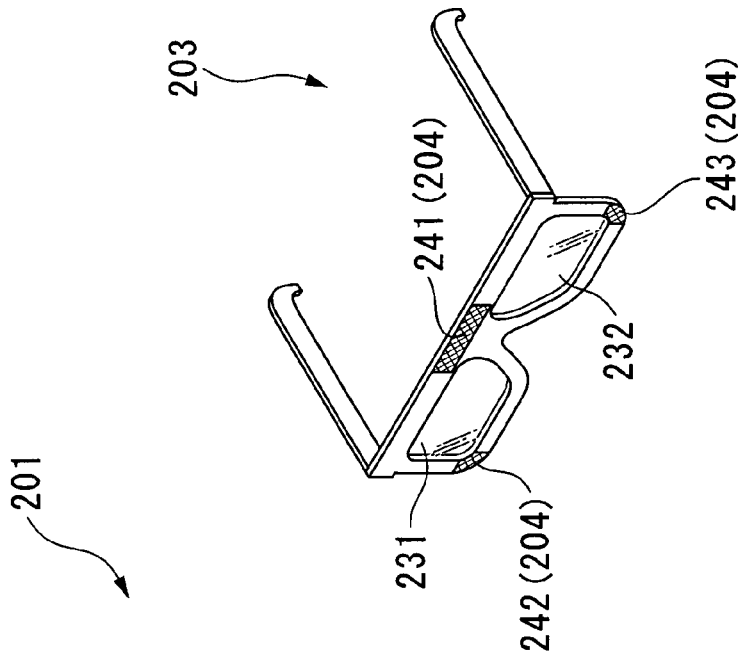
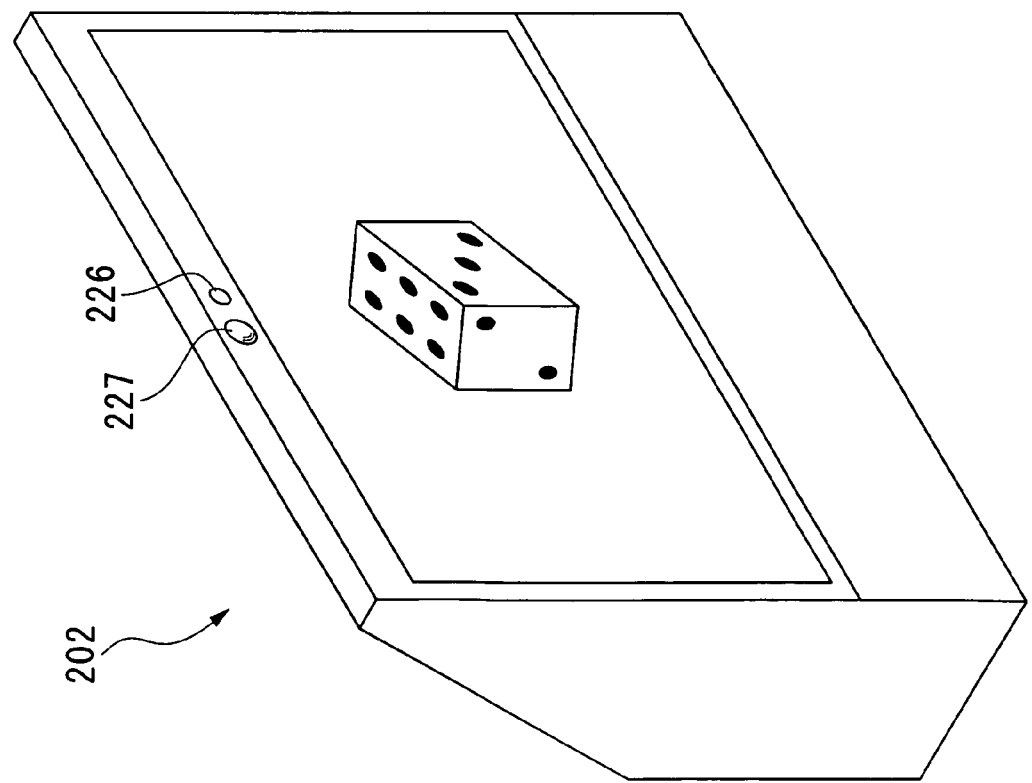

RIGHT EYE IMAGE

LEFT EYE IMAGE

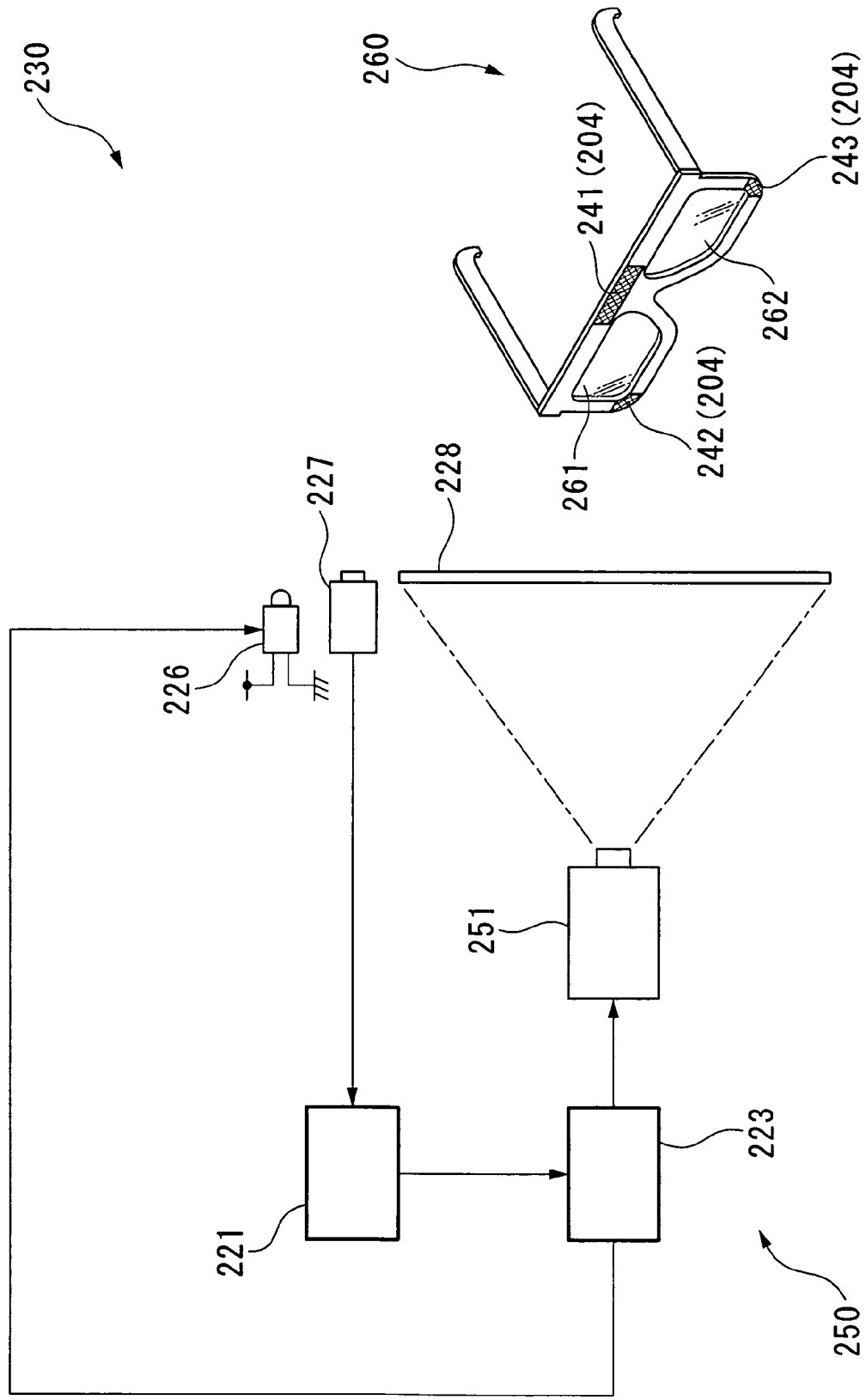

STEREOSCOPIC IMAGE DISPLAY SYSTEM

BACKGROUND OF THE INVENTION

1. Field of the Invention

The present invention relates to a stereoscopic image display system.

Priority is claimed on Japanese Patent Applications Nos. 2004-271510 and 2004-271511, filed Sep. 17, 2004, the contents of which is incorporated herein by reference.

2. Description of the Related Art

A human recognizes a visible object as a stereoscopic image using his/her brain while combining an image viewed by a right eye and an image viewed by a left eye. Since the right and left eyes view the object from different angles, the image viewed by the right eye and the image viewed by the left eye are slightly different from each other, thereby making it possible to achieve this.

Therefore, allowing a viewer to recognize an image displayed two-dimensionally as a stereoscopic image can be achieved by displaying a parallax image composed of the image viewed by the right eye (right eye image) and the image viewed by the left eye (left eye image), thereby allowing only the right eye image to reach the right eye of the viewer and only the left eye image to reach the left eye of the viewer.

Specifically, a stereoscopic image display system is provided with an image display unit that displays the parallax image, and glasses having a transmission portion for the right eye transmitting only the right eye image of the parallax image and a transmission portion for the left eye transmitting only the left eye image of the parallax image while not transmitting the right eye image, wherein the viewer recognizes the stereoscopic image by wearing the glasses. The glasses generally utilize circular polarizing glasses that transmit circularly polarized light with different rotation angles for the transmission portions for the right eye and the left eye, or liquid crystal shutter glasses where the states of the transmission portions for the right eye and the left eye are changed between a transmitting mode and a non-transmitting mode alternately. When the circular polarizing glasses are used, the right eye image of the parallax image is circularly polarized light with a rotation angle that allows the image to be transmitted through the transmission portion for the right eye, while the left eye image of parallax image is circularly polarized light with a rotation angle that allows the image to be transmitted through the transmission portion for the left eye, thereby allowing only the right eye image to reach the right eye of the viewer and only the left eye image to reach the left eye of the viewer. When the liquid crystal shutter glasses are used, the right eye image of the parallax image is displayed when the transmission portion for the right eye is in the transmitting mode and the transmission portion for the left eye is in the non-transmitting mode, while the left eye image of the parallax image is displayed when the transmission portion for the right eye is in the non-transmitting mode and the transmission portion for the left eye is in the transmitting mode, thereby allowing only the right eye image to reach the right eye of the viewer and only the left eye image to reach the left eye of the viewer.

Some of the stereoscopic image display systems provided with such glasses are configured to allow the object viewed from an arbitrary angle by displaying the parallax image in accordance with the free movement of the viewer (refer to Japanese Unexamined Patent Application, First Publication No. 2004-12626).

Specifically, the position of the viewer is detected by detecting the position of the glasses, and the parallax image is displayed based on the detection result.

However, in a conventional stereoscopic image display system, only the position of the glasses is detected while not considering the inclination of the glasses. That is, when the inclination of the glasses is changed at the same position, the parallax image of the stereoscopic image display system is still the same as that displayed before the inclination of the glasses is changed. For example, when the viewer tilts his head for viewing an object displayed by a certain stereoscopic image display system from beneath, the inclination component of the glasses is not recognized by the stereoscopic image display system, thereby making the viewer unable to view the object from the desired angle, bringing about viewer discomfort.

Moreover, because the image display unit displays the right eye image and the left eye image, both the right eye image and the left eye image reach both eyes of the viewer when the viewer takes the glasses off, so that the viewer sees a double image displayed on the image display unit. Therefore, when the viewer has desired to view the displayed object as a two-dimensional (2D) image, it has been impossible to fulfill this need.

Although some of the stereoscopic image display systems are provided with an image display apparatus having an operation unit to switch over between three-dimensional (3D) display and 2D display, such stereoscopic image display systems require the viewer to switch over between the 3D display and the 2D display, and thereby the viewer feels this as burdensome.

SUMMARY OF THE INVENTION

A first aspect of the present invention is, in view of the foregoing problems, to display a more natural stereoscopic image by displaying a parallax image in accordance with the inclination of glasses.

To achieve the above object, a stereoscopic image display system includes: an image display unit that displays a parallax image composed of a right eye image and a left eye image; glasses having a transmission portion for a right eye transmitting only the right eye image of the parallax image and a transmission portion for a left eye transmitting only the left eye image of the parallax image; an inclination detection unit that detects an inclination of the glasses; a parallax image generation unit that generates the parallax image in accordance with a detection result from the inclination detection unit; and a display unit that displays the parallax image generated by the parallax image generation unit.

According to the stereoscopic image display system of the first aspect of the present invention, the inclination of the glasses is detected by the inclination detection unit, the parallax image is generated by the parallax image generation unit in accordance with the detection result, and the generated parallax image is displayed by the display unit. Therefore, according to the stereoscopic image display system of the present invention, the parallax image can be displayed in accordance with the inclination of the glasses, and thereby the appropriate parallax image can be displayed in accordance with the movement of the viewer when the viewer tilts his head, resulting in a more natural stereoscopic image being able to be displayed.

Specifically, the inclination detection unit may adopt a configuration having an invisible light emission unit that emits light outside the visible region and a light reception unit for receiving the light, the invisible light emission unit and the light reception unit being disposed in the image display unit, a retroreflector disposed on the glasses, and an inclination calculation unit that calculates the inclination of the glasses in accordance with the light reception result from the light reception unit.

In the stereoscopic image display system adopting such a configuration, the light outside the visible region emitted from the invisible light emission unit is reflected by the retroreflector and received by the light reception unit, and the inclination of the glasses is calculated by the inclination calculation unit in accordance with the light reception result from the light reception unit.

Moreover, in the stereoscopic image display system adopting such a configuration, because the light emitted for the detection of the inclination of the glasses is outside the visible region, the inclination of the glasses can be detected without affecting the parallax image.

Furthermore, the retroreflector is the only member disposed on the glasses for detecting the inclination of the glasses, resulting in the inclination of the glasses being able to be detected without disposing a device such as a power source. Therefore, the inclination of the glasses can be detected while the weight of the glasses is not substantially increased.

More specifically, in the stereoscopic image display system of the first aspect of the present invention, a configuration may be adopted where a plurality of the retroreflectors are disposed, and the inclination calculation unit calculates the relative positional relationship of the retroreflectors in accordance with the light reception result from the light reception unit, thereby calculating the inclination of the glasses from the relative positional relationship of the retroreflectors.

In the stereoscopic image display system of the present invention adopting such a configuration, the inclination calculation unit calculates the relative positional relationship of the retroreflectors based on the light reception result from the light reception unit, thereby calculating the inclination of the glasses from the relative positional relationship of the retroreflectors.

Here, in the stereoscopic image display system of the first aspect of the present invention, it is preferable to adopt a configuration where the retroreflectors are disposed on respective apexes of an isosceles triangle.

The isosceles triangle changes its shape for all rotation angles. Therefore, by disposing the retroreflectors on the respective apexes of the isosceles triangle, it is possible to reliably detect the inclination of the glasses regardless of the angle of the glasses. Moreover, since the shape of the glasses is generally symmetric about the centerline of the human body, the isosceles triangle can be laid out on the glasses easily.

Furthermore, in the stereoscopic image display system of the first aspect of the present invention, it is preferable to adopt a configuration where a distance detection unit is provided to detect a distance from the image display unit to the glasses and the parallax image generation unit generates the parallax image in accordance with the detection results of the inclination detection unit and the distance detection unit.

In the stereoscopic image display system of the first aspect of the present invention adopting such a configuration, the distance from the image display unit to the glasses is detected by the distance detection unit, and the parallax image is generated in accordance with the detection results of the inclination detection unit and the distance detection unit. Therefore, a parallax image in accordance with not only the inclination of the glasses but also the distance from the image display unit to the glasses can be displayed.

Specifically, the distance detection unit may adopt a configuration having an invisible light emission unit that emits light outside the visible region and a light reception unit for receiving the light, the invisible light emission unit and the light reception unit being disposed in the image display unit, a plurality of retroreflectors being disposed on a side of the glasses side, and a distance calculation unit that calculates the distance from the image display unit to the glasses in accordance with the light reception result from the light reception unit.

By adopting such a configuration, when the inclination detection unit is configured to be provided with the invisible light emission unit, the light reception unit and the retroreflectors, these invisible light emission unit, light reception unit and retroreflectors can be also used as one configuration of the distance detection unit.

In the stereoscopic image display system of the first aspect of the present invention, when calculating the distance from the image display unit to the glasses, a configuration may be adopted where at least three retroreflectors are provided, at least one of which is disposed off a straight line, and the distance calculation unit calculates the distance from the image display unit to the glasses based on the area of a diagram obtained by connecting light emission points in the light reception result from the light reception unit.

The diagram obtained by connecting the light emission points in the light reception result from the light reception unit changes in accordance with the distance from the image display unit to the glasses. Specifically, the area of the diagram obtained by connecting the light emission points in the light reception result from the light reception unit becomes smaller when the glasses are positioned at a point far from a predetermined position, while the area of the diagram obtained by connecting the light emission points in the light reception result from the light reception unit becomes larger when the glasses are positioned at a point near the predetermined position. Therefore, the distance from the image display unit to the glasses can be calculated by storing preliminarily the area of the diagram at the predetermined position and comparing it with the area of the diagram obtained by connecting the light emission points in the light reception result from the light reception unit.

Moreover, in the stereoscopic image display system of the first aspect of the present invention, a configuration may be adopted where the invisible light emission unit is an infrared LED (light emitting diode) emitting infrared light and the light reception unit is an infrared camera.

Since infrared LEDs are available at a low price, the stereoscopic image display system can be manufactured at a low price when using an infrared LED as the invisible light emission unit.

Moreover, in the stereoscopic image display system of the first aspect of the present invention, a projector can be used as the display unit.

Furthermore, in the stereoscopic image display system of the first aspect of the present invention, a configuration may be adopted where the glasses are circular polarizing glasses that transmit circularly polarized light with different rotation angles for the right and left transmission portions.

Here, when such a configuration is adopted, the right eye image of the parallax image is circularly polarized light with a rotation angle that allows the image to be transmitted through the transmission portion for the right eye, while the left eye image of the parallax image is circularly polarized light with a rotation angle that allows the image to be transmitted through the transmission portion for the left eye.

Furthermore, in the stereoscopic image display system of the first aspect of the present invention, a configuration may be adopted where the glasses are liquid crystal shutter glasses where the transmission portions for the right eye and the left eye are changed from a transmitting mode to a non-transmitting mode alternately.

Here, when such a configuration is adopted, the right eye image of the parallax image is displayed when the transmission portion for the right eye is in the transmitting mode and the transmission portion for the left eye is in the non-transmitting mode, while the left eye image of the parallax image is displayed when the transmission portion for the right eye is in the non-transmitting mode and the transmission portion for the left eye is in the transmitting mode.

A second aspect of the present invention is, in view of the foregoing problems, to realize preferred display conditions for a viewer without requiring viewer's intervention and regardless of whether the glasses are in the put-on condition or in the taken-off condition.

To achieve the above object, a stereoscopic image display system includes: an image display unit that displays a parallax image composed of a right eye image and a left eye image; a transmission portion for a right eye transmitting only the right eye image of the parallax image and a transmission portion for a left eye transmitting only the left eye image of the parallax image; a put-on/taken-off determination unit that determines whether the glasses are put on or taken off; and an image generation unit that generates the parallax image when it is determined that the glasses are in a put-on condition by the put-on/taken-off determination unit, and generates only either of the right eye image and the left eye image of the parallax image when it is determined that the glasses are in a taken-off condition by the put-on/taken-off determination unit.

In the stereoscopic image display system of the second aspect of the present invention having such characteristics, the put-on/taken-off condition of the glasses is determined by the put-on/taken-off determination unit, and the image generation unit generates the parallax image when it is determined that the glasses are in a put-on condition by the put-on/taken-off determination unit and generates either the right eye image or the left eye image of the parallax image when it is determined that the glasses are in a taken-off condition by the put-on/taken-off determination unit. Therefore, according to the stereoscopic image display system of the present invention, the put-on/taken-off determination unit automatically switches over between 3D display and 2D display, and thereby preferred display conditions for the viewer can be realized without requiring viewer's intervention and regardless of whether the glasses are in the put-on condition or in the taken-off condition.

More specifically, the put-on/taken-off determination unit may adopt a configuration having an invisible light emission unit that emits light outside the visible region and the light reception unit for receiving the light, the invisible light emission unit and the light reception unit being disposed in the image display unit, the retroreflector being disposed on a side of the glasses side, and determination unit for determining the put-on/taken-off condition of the glasses in accordance with the light reception result from the light reception unit.

In the stereoscopic image display system adopting such a configuration, the light outside the visible region emitted from the invisible light emission unit is reflected by the retroreflector and received by the light reception unit, and the put-on/taken-off condition of the glasses is determined in accordance with the light reception result from the light reception unit.

Moreover, in the stereoscopic image display system adopting such a configuration, because the light emitted for the determination of the put-on/taken-off condition of the glasses is that outside the visible region, the inclination of the glasses can be detected without affecting the display image.

Furthermore, only the retroreflector is the member disposed on the glasses for detecting the inclination of the glasses, resulting in the put-on/taken-off condition of the glasses being able to be detected without disposing a device such as a power source. Therefore, the inclination of the glasses can be detected while the weight of the glasses is not substantially increased.

In the stereoscopic image display system of the second aspect of the present invention, the determination unit may adopt a configuration where a movement of the retroreflector is detected from the light reception result and it is determined that the glasses are taken off when the movement of the retroreflector is not detected for a predetermined period of time.

Moreover, a configuration can also be adopted where at least three retroreflectors are provided, at least one of which is disposed off a straight line, and the determination unit detects the inclination of the glasses from the light reception result and determines that the glasses are in the taken-off condition when the inclination of the glasses deviates from a predetermined range.

Furthermore, the determination unit may adopt a configuration where it is determined that the glasses are in the taken-off condition when irises of the viewer are recognized at a position away from the retroreflector at more than a predetermined distance.

Furthermore, in the stereoscopic image display system of the present invention, a configuration may be adopted where the glasses are the circular polarizing glasses that transmit circularly polarized light with different rotation angles for the right and left transmission portions.

Here, when such a configuration is adopted, the right eye image of the parallax image is circularly polarized light with a rotation angle that allows the image to be transmitted through the transmission portion for the right eye, while the left eye image of the parallax image is circularly polarized light with a rotation angle that allows the image to be transmitted through the transmission portion for the left eye.

Moreover, in the stereoscopic image display system of the present invention, a configuration may be adopted where the glasses are liquid crystal shutter glasses where the states of the transmission portions for the right eye and the left eye are changed between the transmitting mode and the non-transmitting mode alternately.

Here, when such a configuration is adopted, the right eye image of the parallax image is displayed when the transmission portion for the right eye is in the transmitting mode and the transmission portion for the left eye is in the non-transmitting mode, while the left eye image of the parallax image is displayed when the transmission portion for the right eye is in the non-transmitting mode and the transmission portion for the left eye is in the transmitting mode.

Moreover, in the stereoscopic image display system of the second aspect of the present invention, a configuration may be adopted where the invisible light emission unit is an infrared LED (light emitting diode) emitting infrared light and the light reception unit is an infrared camera.

Since infrared LEDs are available at a low price, the stereoscopic image display system can be manufactured at a low price using an infrared LED as the invisible light emission unit.

Moreover, in the stereoscopic image display system of the second aspect of the present invention, a projector may be used as the display unit.

BRIEF DESCRIPTION OF THE DRAWINGS

FIG. 1 is a perspective view illustrating a schematic configuration of a stereoscopic image display system according to a first embodiment of a first aspect of the present invention;

FIG. 9 is a diagram illustrating an internal configuration of the image display apparatus and glasses of the stereoscopic image display system according to a second embodiment of the first aspect of the present invention;

FIG. 10 is a perspective view illustrating a schematic configuration of the stereoscopic image display system according to a first embodiment of a second aspect of the present invention;

FIG. 14 is a diagram illustrating an internal configuration of the image display apparatus and the glasses of the stereoscopic image display system according to a second embodiment of the second aspect of the present invention.

DETAILED DESCRIPTION OF THE INVENTION

First Aspect

Hereinafter, an embodiment of a stereoscopic image display system according to a first aspect of the present invention will be described with reference to the drawings. Here, in the following drawings, the scale of each member is modified as appropriate for illustrating each of the members at a recognizable size.

First Embodiment

FIG. 1 is a perspective view illustrating a schematic configuration of a stereoscopic image display system according to the first embodiment of the first aspect of the present invention. As shown in this figure, the stereoscopic image display system 101 of the first embodiment is provided with an image display apparatus 102 and glasses 103.

Figure 2:
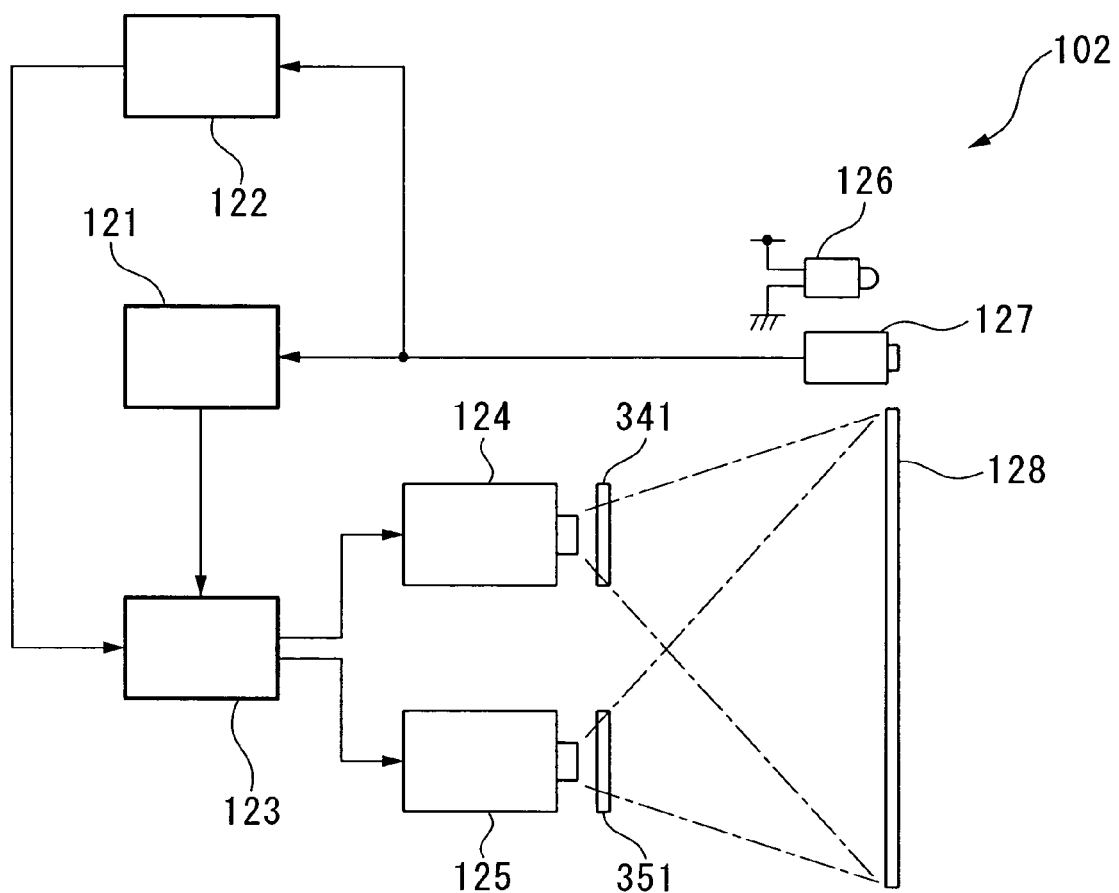
FIG. 2 is a block diagram illustrating an internal configuration of the image display apparatus.

The image display apparatus 102 displays a parallax image composed of a right eye image and a left eye image. A block diagram illustrating an internal configuration of the image display apparatus 102 is shown in FIG. 2. As shown in FIG. 2, the image display apparatus 102 is configured to be provided with an inclination calculation section 121 (inclination calculation unit), a distance calculation section 122 (distance calculation unit), a parallax image generating section 123 (parallax image generation unit), a projector 124 for the left eye image (display unit), and a projector 125 for the right eye image (display unit), inside a chassis.

Moreover, the image display apparatus 102 is provided with an infrared LED 126 (invisible light emission unit), an infrared camera (light reception unit) 127, and a screen 128, wherein the infrared LED 126, the infrared camera 127, and the screen 128 are provided on the image display apparatus 102.

The inclination calculation section 121 calculates the inclination of the glasses 103 in accordance with the image pickup result (light reception result) of the infrared camera 127, and is connected with the infrared camera 127 disposed on the surface of the image display apparatus 102.

The distance calculation section 122 calculates the distance from the image display apparatus 102 to the glasses 103 in accordance with the image pickup result (light reception result) of the infrared camera 127, and is connected with the infrared camera 127 as with the inclination calculation section 121.

The parallax image generating section 123 generates the parallax image in accordance with the inclination of the glasses 103 as the calculation result of the inclination calculation section 121 and the distance from the image display apparatus 102 to the glasses 103 as the calculation result of the distance calculation section 122, and is connected with the inclination calculation section 121 and the distance calculation section 122.

Here, 3D data of an object to be displayed is stored beforehand in the parallax image generating section 123, and thereby the parallax image generating section 123 generates the parallax image by selecting appropriate data from the 3D data in accordance with the calculation results from the inclination calculation section 121 and the distance calculation section 122.

The projector 124 for the left eye image projects the left eye image of the parallax image generated by the parallax image generating section 123 to display the left eye image on the screen 128.

The projector 125 for the right eye image projects the right eye image of the parallax image generated by the parallax image generating section 123 to display the right eye image on the screen 128.

As the projector 124 for the left eye image and the projector 125 for the right eye image, a three-panel LCD (liquid crystal display) projector using three LCD light bulbs as light modulation devices can be used. Moreover, a single-panel LCD projector using one LCD light bulb as the light modulation device or a projector using a micromirror array device as the light modulation device can also be used.

Here, as shown in FIG. 2, circular polarizing plates 341 and 351 are disposed at the rear of the projector 124 for the left eye image and the projector 125 for the right eye image, respectively. These circular polarizing plates 341 and 351 transform transmitted light into polarized light having different rotation angles from each other, and, in the stereoscopic image display system 101 of the first embodiment, the circular polarizing plate 341 disposed at the rear of the projector 124 for the left eye image transforms the transmitted light into polarized light having a left rotational direction as seen from the image display apparatus 102 in the direction to the glasses 103, while the circular polarizing plate 351 disposed at the rear of the projector 125 for the right eye image transforms the transmitted light into polarized light having a right rotational direction as seen from the image display apparatus 102 in the direction to the glasses 103.

Moreover, the infrared LED 126 emits infrared light (light outside the visible region), and is disposed so as to face the viewer, i.e., the glasses 103.

The infrared camera 127 is, as shown in FIG. 1 as well, disposed in proximity to the infrared LED 126 to pickup the image from the direction of the viewer, i.e., the glasses 103.

Referring again to FIG. 1, the glasses 103 are worn by the viewer, having a transmission portion 131 for the right eye transmitting only the right eye image of the parallax image displayed on the screen 128 and a transmission portion 132 for the left eye transmitting only the left eye image of the parallax image displayed on the screen 128.

Moreover, the transmission portion 131 for the right eye and the transmission portion 132 for the left eye are disposed such that, when the glasses 103 are worn by the viewer, the transmission portion 131 for the right eye is positioned in front of the right eye of the viewer while the transmission portion 132 for the left eye is positioned in front of the left eye of the viewer.

Specifically, the glasses 103 of the stereoscopic image display system 101 of the first embodiment are circular polarizing glasses that transmit circularly polarized light having different rotation angles for the transmission portion 131 for the right eye and the transmission portion 132 for the left eye. In the first embodiment, the transmission portion 131 for the right eye is configured for the circular polarizing plate transmitting only circularly polarized light in the right rotational direction as seen from the image display apparatus 102 in the direction to the glasses 103, while the transmission portion 132 for the left eye is configured for the circular polarizing plate transmitting only circularly polarized light in the left rotational direction as seen from the image display apparatus 102 in the direction to the glasses 103.

Here, since the circularly polarized light changes its rotation direction when reflected, when image light projected from the projector 124 for the left eye image and the projector 125 for the right eye image is reflected, the rotation directions of the circularly polarized light transmitted through the transmission portion 131 for the right eye and the transmission portion 132 for the left eye are changed based on the number of reflection times of the light. That is, the transmission portion 131 for the right eye and the transmission portion 132 for the left eye are selected allowing the image light emitted from the projector 124 for the left eye image to reach only the left eye of the viewer and the image light emitted from the projector 125 for the right eye image to reach only the right eye of the viewer.

Moreover, a plurality of retroreflectors 104 is disposed on the frame of the glasses 103. The retroreflectors 104 include three retroreflectors (141 to 143) in the first embodiment, the retroreflectors 141 to 143 being disposed on each apex of an isosceles triangle, respectively.

Here, the retroreflector 104 reflects the light in the direction of its incidence, and can use glass beads, etc.

Here, in the stereoscopic image display system 101 of the first embodiment, inclination detection unit of the present invention is configured to be provided with the inclination calculation section 121, the infrared LED 126, the infrared camera 127, and the retroreflector 104.

Moreover, in the stereoscopic image display system 101 of the first embodiment, the distance detection unit is configured to be provided with the distance calculation section 122, the infrared LED 126, the infrared camera 127, and the retroreflector 104, wherein the infrared LED 126, the infrared camera 127, and the retroreflector 104 are also used by the inclination detection unit.

Next, operations of such a configured stereoscopic image display system 101 of the first embodiment will be described with reference to a flowchart of FIG. 3.

Figure 3:
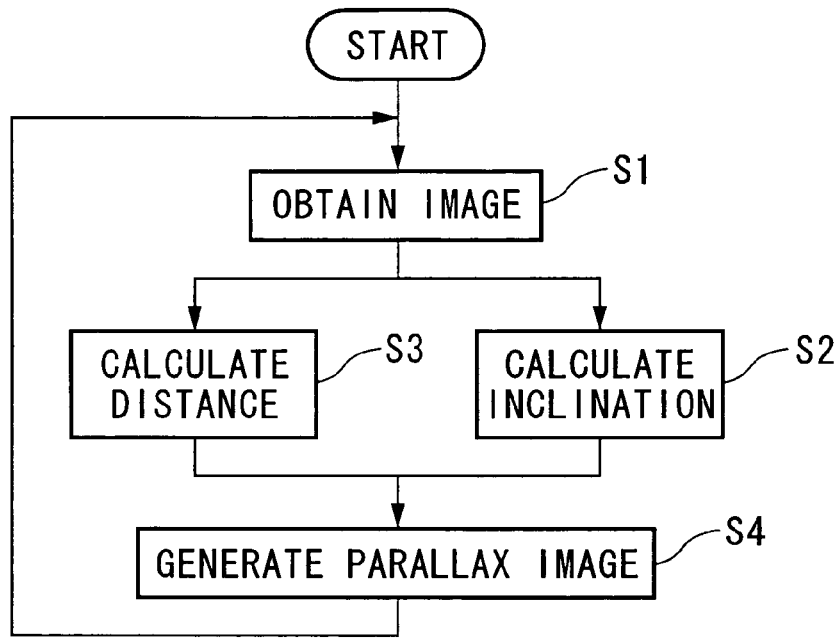
FIG. 3 is a flowchart illustrating operations of the stereoscopic image display system according to the first embodiment of the first aspect of the present invention.

As shown in FIG. 3, in the operations of the stereoscopic image display system 101, an image is obtained by the infrared camera 127 (Step S1). Here, the infrared camera 127 is for detecting infrared light, so that the image is obtained by visualizing the infrared light emitted from the infrared LED 126 and reflected by the retroreflector 104 disposed on the glasses 103.

Figure 4:
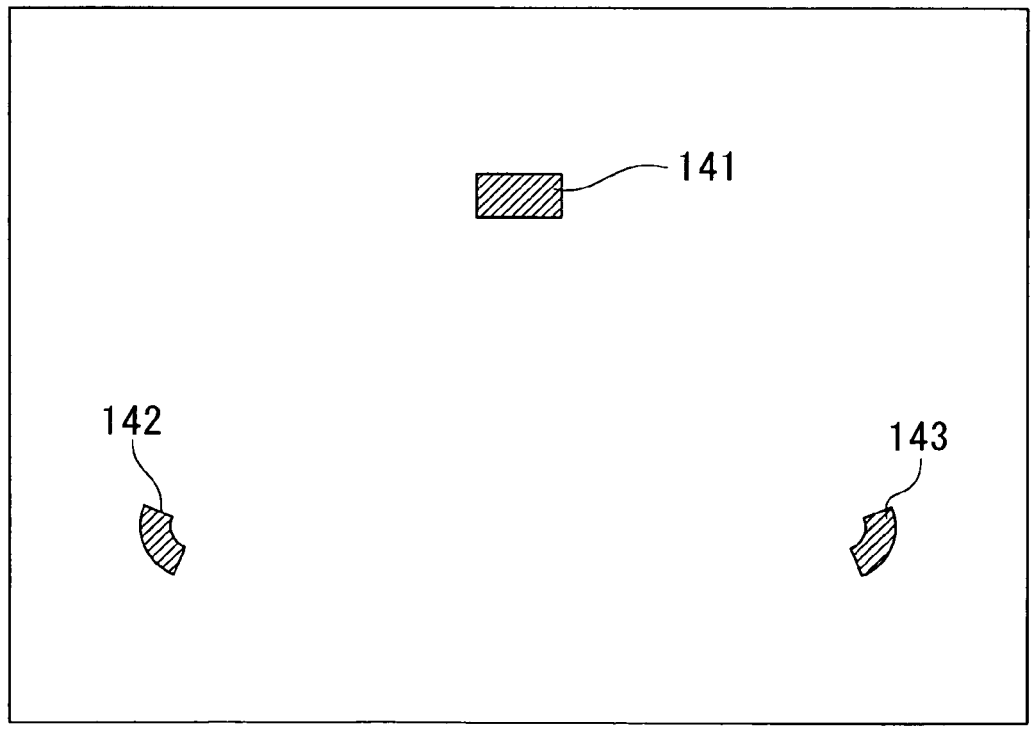
FIG. 4 is a diagram illustrating the operations of the stereoscopic image display system according to the first embodiment of the first aspect of the present invention.

FIG. 4 illustrates schematically the images obtained by the infrared camera 127. As shown in this figure, it is considered that the image is obtained in Step S1 having the retroreflector 141 disposed on the top vertex of the isosceles triangle and the other retroreflectors 142 and 143 disposed on the bottommost thereof.

When the image such that as shown in FIG. 4 is obtained, the inclination calculation section 121 calculates the inclination of the glasses 103 in accordance with the image pickup result (image) of the infrared camera 127 (Step S2).

Specifically, the inclination calculation section 121 calculates the inclination of the glasses 103 by calculating coordinates of the respective retroreflectors 141 to 143 to calculate the relative positional relationship of the retroreflectors 141 to 143 and comparing the coordinates with coordinates of pre-stored retroreflectors 141a to 143a.

Figure 5:
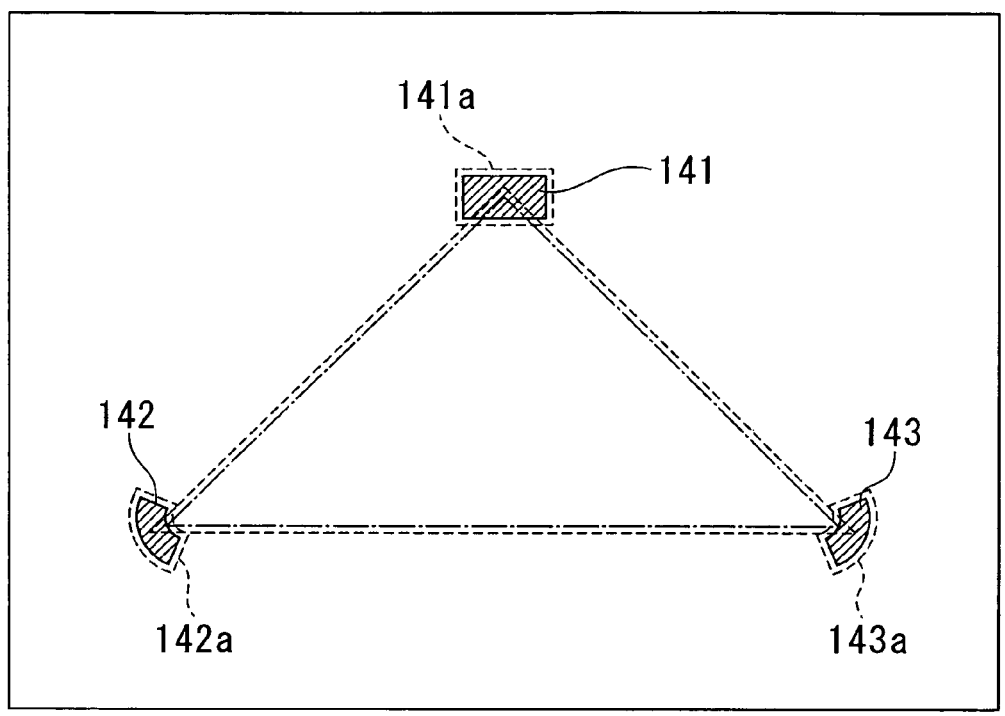
FIG. 5 is a diagram illustrating the operations of the stereoscopic image display system according to the first embodiment of the first aspect of the present invention.

For example, in the case in which the coordinates of the pre-stored retroreflectors 141a to 143a are those for the condition where the glasses 103 are in a horizontal position, as shown in FIG. 5, the retroreflectors 141a to 143a in a horizontal position and the retroreflectors 141 to 143 of the image are compared. Then, the magnitude of angular displacement of a segment 142-143 (a long unequal side of the isosceles triangle) against a segment 142a-143a (a long side of the isosceles triangle as well) is obtained and it is determined whether or not the positional relationship between the retroreflector 141 as the top vertex of the isosceles triangle and the segment 142-143 is identical to that between the retroreflector 141a disposed at the top vertex of the isosceles triangle and the segment 142a-143a, thereby calculating the magnitude of the angular displacement and the rotation direction of the glasses 103 at present.

In Step S2, the segment 142-143 is not displaced from the segment 142a-143a and the position of the retroreflector 141 relative to the segment 142-143 is identical to the position of the retroreflector 141a relative to the segment 142a-143a, as shown in FIG. 5, and thereby the inclination calculation section 121 determines that the inclination of the glasses 103 is to be in the horizontal position (0 degrees).

The foregoing example is described by way of example, and the positions and the coordinate system of the pre-stored retroreflectors 141a to 143a as well as the positions and the current coordinate system of the retroreflectors 141 to 143 to be compared therewith are selected arbitrarily.

Furthermore, in the operations of the stereoscopic image display system of the first embodiment, Step S2 of calculating the inclination of the glasses 103 by the inclination calculation section 121 and Step S3 of calculating the distance from the image display apparatus 102 to the glasses 103 using the distance calculation section 122 are performed simultaneously, as shown in FIG. 3.

In Step S3, the distance calculation section 122 calculates the distance from the image display apparatus 102 to the glasses 103 in accordance with the image pickup result (image) of the infrared camera 127.

Specifically, the distance calculation section 122 compares the area of a diagram (isosceles triangle) obtained by connecting the pre-stored retroreflectors 141a to 143a with the area of a diagram (isosceles triangle) obtained by connecting the actual retroreflectors 141 to 143 (light emission points in the image), thereby calculating the distance from the image display apparatus 102 to the glasses 103.

For example, in the case in which the area of the diagram obtained by connecting the retroreflectors 141a to 143a is the area calculated when the glasses 103 are at the reference position, the distance calculation section 122 determines that the glasses 103 are positioned closer than the reference position when the area of the diagram obtained by connecting the retroreflectors 141 to 143 is larger than that obtained by connecting the retroreflectors 141a to 143a, and determines that the glasses 103 are positioned further than the reference position when the area of the diagram obtained by connecting the retroreflectors 141 to 143 is smaller than that obtained by connecting the retroreflectors 141a to 143a. Moreover, the distance calculation section 122 stores data that relates the rate of the change in the area to the rate of the change in the distance beforehand, wherein the distance from the image display apparatus 102 to the glasses 103 is calculated based on the data.

In Step S3, the area of the diagram obtained by connecting the retroreflectors 141 to 143 is identical to that obtained by connecting the retroreflectors 141a to 143a, as shown in FIG. 5, and thereby the distance calculation section 122 determines that the glasses 103 are at the reference position (for example, the distance from the image display apparatus 102 to the glasses 103 is three meters).

The foregoing example is described by way of example, and the distance from the image display apparatus 102 to the glasses 103 can be calculated, for example, by comparing the length of the segment 142a-143a with that of the segment 142-143. Moreover, the distance from the image display apparatus 102 to the glasses 103 can also be calculated, for example, by connecting the distance calculation section 122 and light from the infrared LED 126 and measuring the time required for the infrared LED 126 to reach the infrared camera 127 after emission.

Next, in the operations of the stereoscopic image display system 101 of the first embodiment, the parallax image generating section 123 generates the parallax image in accordance with the calculation result of the inclination calculation section 121 (detection result of the inclination detection unit) and the calculation result of the distance calculation section 122 (distance calculation unit) (Step S4).

Specifically, the parallax image generating section 123 generates the right eye image and the left eye image by selecting the appropriate data from the pre-stored 3D data in accordance with the calculation results from the inclination calculation section 121 and the distance calculation section 122.

Figure 6A:
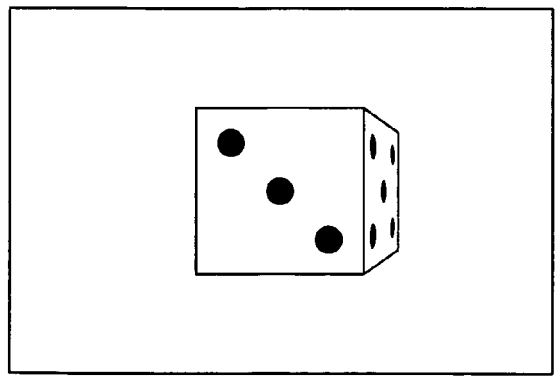
FIGS. 6A and 6B are diagrams illustrating the operations of the stereoscopic image display system according to the first embodiment of the first aspect of the present invention.
Figure 6B:
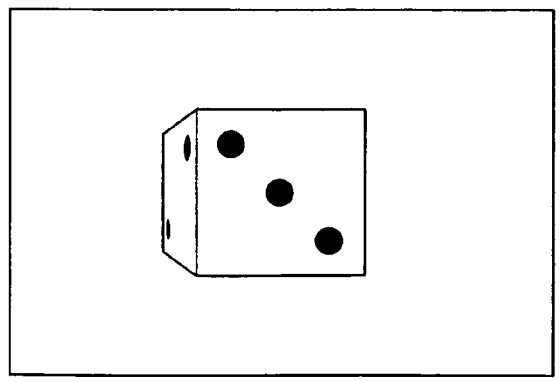

Here, as described above, in the operation of the stereoscopic image display system 101, the angle of the glasses 103 is in the horizontal position and is positioned in the reference position. In the case in which the image of a die is displayed, for example, the image data of the die as shown in FIG. 6A identical to the image viewed by the right eye of the viewer without tilting his head and positioned at the reference position is selected as the right eye image, while the image data of the die as shown in FIG. 6B identical to the image viewed by the left eye of the viewer without tilting his head and positioned at the reference position is selected as the left eye image.

Then, after the left eye image data and the right eye image data of the parallax image generated by the parallax image generating section 123 are input to the projector 124 for the left eye image and the projector 125 for the right eye image, respectively, the left eye image is projected on the screen 128 from the projector 124 for the left eye image and the right eye image is projected on the screen 128 from the projector 125 for the right eye.

Here, the image light of the left eye image projected on the screen 128 from the projector 124 for the left eye image is transformed at the circular polarizing plate 341 into polarized light having a left rotational direction as seen from the image display apparatus 102 in the direction to the glasses 103, while the image light of the right eye image projected on the screen 128 from the projector 125 for the right eye image is transformed at the circular polarizing plate 351 into polarized light having a right rotational direction as seen from the image display apparatus 102 in the direction to the glasses 103.

In the glasses 103 of the stereoscopic image display system 101 of the first embodiment, the transmission portion 131 for the right eye is configured for the circular polarizing plate transmitting only the circularly polarized light in the right rotational direction as seen from the image display apparatus 102 in the direction to the glasses 103, while the transmission portion 132 for the left eye is configured for the circular polarizing plate transmitting only the circularly polarized light in the left rotational direction as seen from the image display apparatus 102 in the direction to the glasses 103, and thereby the right eye image reaches only the right eye of the viewer and the left eye image reaches only the left eye of the viewer. As a result, the brain of the viewer combines the right eye image and the left eye image so that the image is recognized as the 3D image by the viewer.

After completing a series of such routines, the stereoscopic image display system 101 of the first embodiment returns to Step S1.

Figure 7:
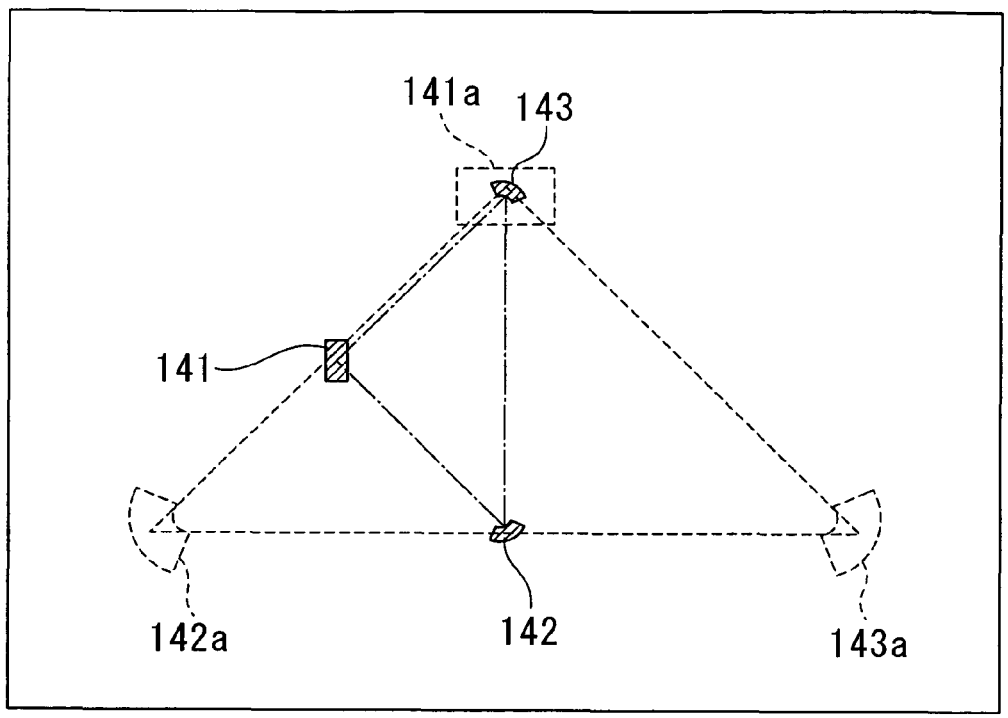
FIG. 7 is a diagram illustrating the operations of the stereoscopic image display system according to the first embodiment of the first aspect of the present invention.

Next, in Step S1 of the operations of the stereoscopic image display system 101 of the first embodiment, when the retroreflectors 142 and 143 are aligned vertically and the retroreflector 141 is positioned on the left of the segment 142-143 as shown in the image in FIG. 7, the inclination calculation section 121, for example, compares the segment 142a-143a and the segment 142-143 and further compares the positions of the retroreflector 141a and the retroreflector 141, thereby determining that the glasses 103 are inclined at 90 degrees to the left in the image (Step S2).

Moreover, because the area of the diagram obtained by connecting the retroreflectors 141 to 143 is smaller than that obtained by connecting the retroreflectors 141a to 143a as the image in FIG. 7 shows, the distance calculation section 122 determines that the position of the glasses 103 is farther than the reference position by one meter, for example (Step S3).

Figure 8A:
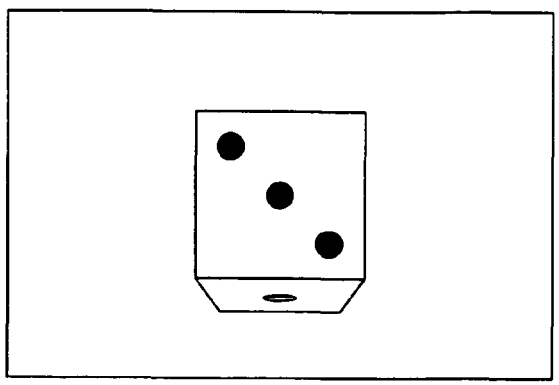
FIGS. 8A and 8B are diagrams illustrating the operations of the stereoscopic image display system according to the first embodiment of the first aspect of the present invention.
Figure 8B:
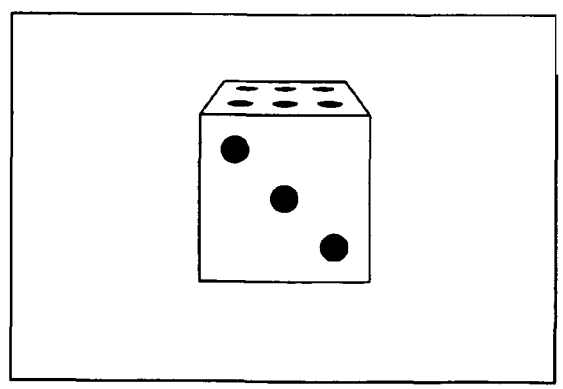

Then, the parallax image generating section 123 generates a parallax image in which the top and bottom surfaces of the die can be viewed as shown in FIGS. 8A and 8B and the size of the die is shown smaller than the images of FIGS. 6A and 6B, in accordance with the calculation results from the inclination calculation section 121 and the distance calculation section 122 (Step S4).

Therefore, because the appropriate parallax image is in accordance with the movement of the viewer when the viewer tilts his head or changes position, a parallax image in accordance with the inclination of the glasses 103 can be displayed resulting in a more natural stereoscopic image being able to be displayed.

In contrast, since the conventional stereoscopic image display system detects only the position of the glasses, the parallax image cannot be generated in accordance with the inclination of the glasses resulting in a parallax image in accordance with the movement of the viewer being unable to be displayed. That is, when the viewer tilts his head without changing position, the parallax image shown in FIGS. 6A and 6B is displayed without being modified.

As described, according to the stereoscopic image display system 101 of the first embodiment, a more natural stereoscopic image can be displayed by displaying the parallax image in accordance with the inclination of the glasses 103.

Moreover, in the stereoscopic image display system 101 of the first embodiment, only the retroreflectors 104 are disposed on the glasses 103 side as the member for calculating the inclination and the distance of the glasses 103, resulting in the inclination and the distance of the glasses 103 being able to be detected without disposing a device such as a power source on the glasses 103. Therefore, the inclination and the distance of the glasses 103 can be detected while the weight of the glasses 103 is not substantially increased.

Moreover, in the stereoscopic image display system 101 of the first embodiment, the infrared light is used to calculate the inclination and the distance of the glasses 103, and thereby the inclination and the distance of the glasses 103 can be calculated without affecting the parallax image. Although ultra-violet light can be used as the light outside the visible region, using infrared light is preferable in consideration of cost and safety.

Furthermore, in the stereoscopic image display system 101 of the first embodiment, the retroreflectors 104 are disposed on each of the apexes of an isosceles triangle, so that the inclination of the glasses 103 can be calculated reliably at every rotation angle of the glasses 103. However, the present invention is not limited thereto, and the retroreflectors 104 can assume any layout as long as the rotation angle of the glasses 103 is accurately calculated. Furthermore, for example, it is possible to dispose only one retroreflector that changes its shape on the image in accordance with the rotation angle and to calculate the inclination of the glasses 103 by the shape of the retroreflector.

Second Embodiment

Next, the second embodiment of the first aspect of the present invention will be described with reference to FIG. 9. In the description of the second embodiment, descriptions regarding parts shared with the first embodiment have been omitted or simplified.

FIG. 9 is a diagram illustrating an internal configuration of an image display apparatus 150 and glasses 160 of the stereoscopic image display system 130 according to the second embodiment. As shown in this figure, the image display apparatus 150 is provided with only one projector 151, and the circular polarizing plates are not disposed at the rear of the projector 151. Moreover, the parallax image generating section 122 and the infrared LED 126 are connected.

The glasses 160 are liquid crystal shutter glasses in which states of a transmission portion 161 for the right eye and a transmission portion 162 for the left eye are changed between a transmitting mode and a non-transmitting mode alternately, configured so that the transmitting mode and the non-transmitting mode are switched between in response to receiving the infrared light.

Moreover, in such a configured stereoscopic image display system 130 of the second embodiment, the parallax image generating section 123 generates the right eye image and the left eye image alternately in accordance with the detection results of the inclination calculation section 121 and the distance calculation section 122, and the image is input as the image data into the projector 151. Therefore, the right eye image and the left eye image are displayed on the screen 128 alternately.

Furthermore, the parallax image generating section 123 outputs a pulse signal at the timing of generation of the right eye image and the left eye image, the pulse signal being input into the infrared LED 126. The infrared LED 126 in turn emits the infrared light in response to the pulse signal being input.

Here, in the stereoscopic image display system 130 of the second embodiment, it is configured so that the modes of the transmission portion 161 for the right eye and the transmission portion 162 for the left eye of the glasses 160 are changed between the transmitting mode and the non-transmitting mode alternately and so that the transmitting and non-transmitting modes are switched between in response to infrared light. Therefore, the right eye image is displayed on the screen 128 when the transmission portion 161 for the right eye is in the transmitting mode and the transmission portion 162 for the left eye is in the non-transmitting mode, while the left eye image is displayed on the screen 128 when the transmission portion 161 for the right eye is in the non-transmitting mode and the transmission portion 162 for the left eye is in the transmitting mode. Thus, the right eye image reaches only the right eye of the viewer and the left eye image reaches only the left eye of the viewer. As a result, the brain of the viewer combines the right eye image and the left eye image so that the image is recognized as a 3D image by the viewer.

Such a stereoscopic image display system 130 of the second embodiment can also achieve effects similar to those of the stereoscopic image display system 101 of the foregoing first embodiment.

Here, a method for switching between the transmitting mode and the non-transmitting mode in the transmission portion 161 for the right eye and the transmission portion 162 for the left eye is not limited to that described above, and any method can be applied as long as the transmission portion 161 for the right eye is in the transmitting mode upon the right eye image being displayed on the screen 128 while the transmission portion 162 for the left eye is in the transmitting mode upon the left eye image being displayed on the screen 128.

While the preferred embodiments of the stereoscopic image display system according to the present invention have been described with reference to the accompanying drawings, it is obvious that the present invention is not limited to the foregoing embodiments. Various shapes or combinations of the respective components of the foregoing embodiments are shown merely by way of example, and various changes and modifications are possible based on design requirements without departing from the scope of the present invention.

For example, while a projector is used as the display unit in the foregoing embodiments, the present invention is not limited thereto and various display devices such as a CRT, a liquid crystal display device, a plasma display panel, an organic EL display device, an inorganic EL display device, a field emission display, or a surface-conduction electron emitter display can be used.

Second Aspect

Hereinafter, an embodiment of the stereoscopic image display system according to a second aspect of the present invention will be described with reference to the drawings. Here, in the following drawings, the scale of each member is modified as appropriate for illustrating each of the members at a recognizable size.

First Embodiment

FIG. 10 is a perspective view illustrating a schematic configuration of the stereoscopic image display system according to the first embodiment of the second aspect of the present invention. As shown in this figure, the stereoscopic image display system 201 of the first embodiment is provided with an image display apparatus 202 and glasses 203.

Figure 11:
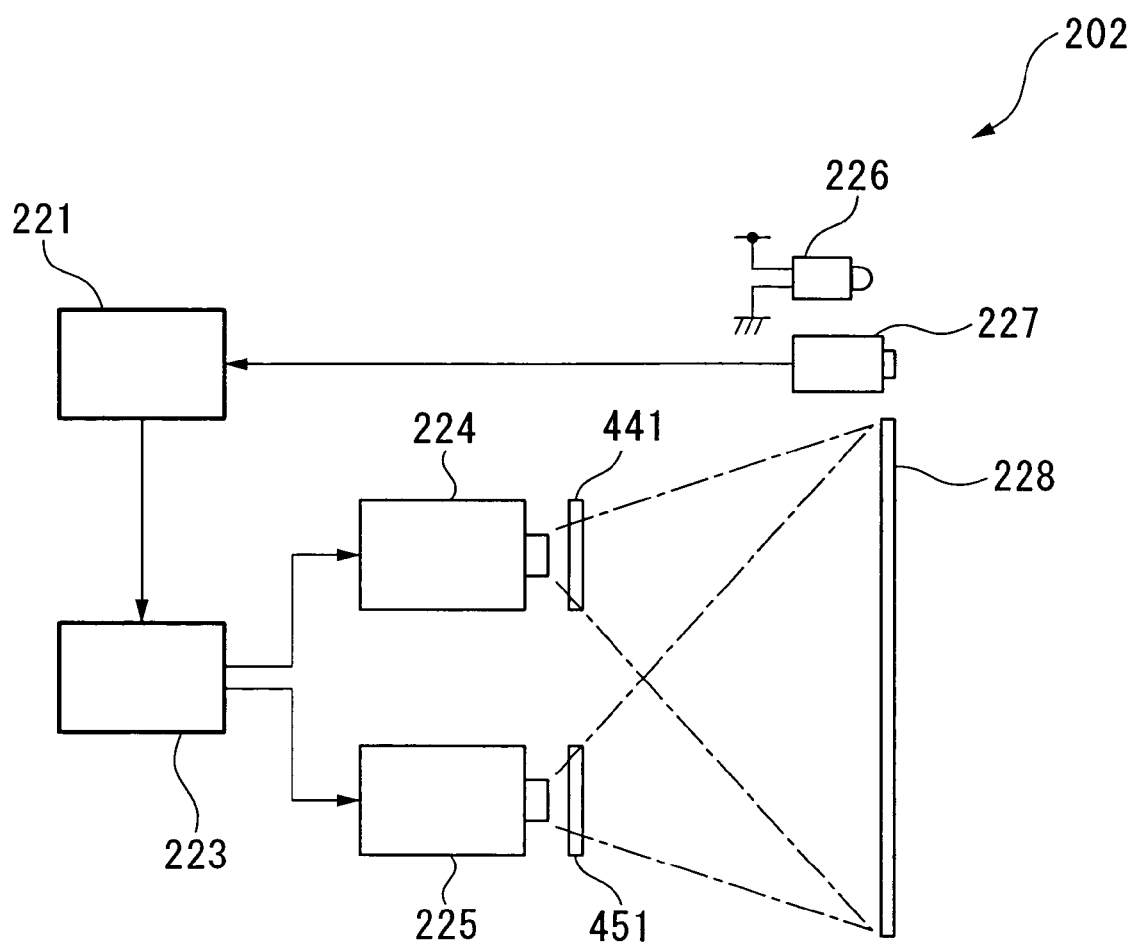
FIG. 11 is a block diagram illustrating an internal configuration of the image display apparatus.

The image display apparatus 202 displays a parallax image composed of the right eye image and the left eye image, or either of a right eye image and a left eye image of the parallax image. A block diagram illustrating an internal configuration of the image display apparatus 202 is shown in FIG. 11. As shown in FIG. 11, the image display apparatus 202 is configured to be provided with a determination section 221 (determination unit), an image generation section 223 (image generation unit), a parallax image generating section 223 (parallax image generation unit), a projector 224 for the left eye image (display unit), and a projector 225 for the right eye image (display unit), inside a chassis.

Moreover, the image display apparatus 202 is provided with an infrared LED 226 (invisible light emission unit), an infrared camera (light reception unit) 227, and a screen 228, wherein the infrared LED 226, the infrared camera 227, and the screen 228 are provided on the image display apparatus 202.

The determination unit 221 determines whether the glasses 203 are put on or taken off in accordance with the image pickup result (light reception result) of the infrared camera 227, and is connected with the infrared camera 227 disposed on the surface of the image display apparatus 202.

The image generation section 223 generates the parallax image or either of the right eye image and the left eye image in accordance with the determination result of the determination section 221, and is connected to the determination section 221.

Here, 3D data of an object to be displayed is stored beforehand in the image generation section 223, and thereby the image generation section 223 generates the parallax image or either of the right eye image and the left eye image by selecting appropriate data from the 3D data in accordance with the determination result of the determination section 221.

The projector 224 for the left eye image projects the left eye image of the parallax image generated by the parallax image generating section 223 to display the left eye image on the screen 228.

The projector 225 for the right eye image projects the right eye image of the parallax image generated by the parallax image generating section 223 to display the right eye image on the screen 228.

As the projector 224 for the left eye image and the projector 225 for the right eye image, a three-panel LCD (liquid crystal display) projector using three LCD light bulbs as light modulation devices can be used. Moreover, a single-panel LCD projector using one LCD light bulb as a light modulation device or a projector using a micromirror array device as a light modulation device can also be used.

Here, as shown in FIG. 11, circular polarizing plates 441 and 451 are disposed at the rear of the projector 224 for the left eye image and the projector 225 for the right eye image, respectively. These circular polarizing plates 441 and 451 transform transmitted light into polarized light having different rotation angles from each other, and, in the stereoscopic image display system 201 of the first embodiment, the circular polarizing plate 441 disposed at the rear of the projector 224 for the left eye image transforms the transmitted light into polarized light having a left rotational direction as seen from the image display apparatus 202 in the direction to the glasses 203, while the circular polarizing plate 451 disposed at the rear of the projector 225 for the right eye image transforms the transmitted light into polarized light having a right rotational direction as seen from the image display apparatus 202 in the direction to the glasses 203.

Moreover, the infrared LED 226 emits infrared light (light outside the visible region), and is disposed so as to face the viewer, i.e., the glasses 203.

The infrared camera 227 is, as also shown in FIG. 10, disposed in proximity to the infrared LED 226 to pickup an image from the direction of the viewer, i.e., the glasses 203.

Referring again to FIG. 10, the glasses 203 are worn by the viewer, having a transmission portion 231 for the right eye transmitting only the right eye image of the parallax image displayed on the screen 228 and a transmission portion 232 for the left eye transmitting only the left eye image of the parallax image displayed on the screen 228. Moreover, the transmission portion 231 for the right eye and the transmission portion 232 for the left eye are disposed such that, when the glasses 203 are worn by the viewer, the transmission portion 231 for the right eye is positioned in front of the right eye of the viewer while the transmission portion 232 for the left eye is positioned in front of the left eye of the viewer.

Specifically, the glasses 203 of the stereoscopic image display system 201 of the first embodiment are circular polarizing glasses that transmit circularly polarized light having different rotation angles for the transmission portion 231 for the right eye and the transmission portion 232 for the left eye. In the first embodiment, the transmission portion 231 for the right eye is configured for the circular polarizing plate transmitting only circularly polarized light in the right rotational direction as seen from the image display apparatus 202 in the direction to the glasses 203, while the transmission portion 232 for the left eye is configured for the circular polarizing plate transmitting only circularly polarized light in the left rotational direction as seen from the image display apparatus 202 in the direction to the glasses 203.

Here, since the circularly polarized light changes its rotation direction when reflected, when image light projected from the projector 224 for the left eye image and the projector 225 for the right eye image is reflected, the rotation directions of the circularly polarized light transmitted through the transmission portion 231 for the right eye and the transmission portion 232 for the left eye are changed based on the number of reflection times of the light. That is, the transmission portion 231 for the right eye and the transmission portion 232 for the left eye are selected allowing the image light emitted from the projector 224 for the left eye image to reach only the left eye of the viewer and the image light emitted from the projector 225 for the right eye image to reach only the right eye of the viewer.

Moreover, a plurality of retroreflectors 204 is disposed on the frame of the glasses 203. The retroreflectors 204 include three retroreflectors (241 to 243) in the first embodiment, the retroreflectors 241 to 243 being disposed on each apex of an isosceles triangle, respectively. That is, at least one of the retroreflectors is disposed off a straight line.

Here, the retroreflector 204 reflects the light in the direction of its incidence, and can use glass beads, etc.

In the stereoscopic image display system 201 of the present invention, the put-on/taken-off determination unit of the present invention is configured to be provided with the determination section 221, the infrared LED 226, the infrared camera 227 and the retroreflector 204.

Next, operations of such a configured stereoscopic image display system 201 of the first embodiment will be described with reference to the flowchart of FIG. 12.

Figure 12:
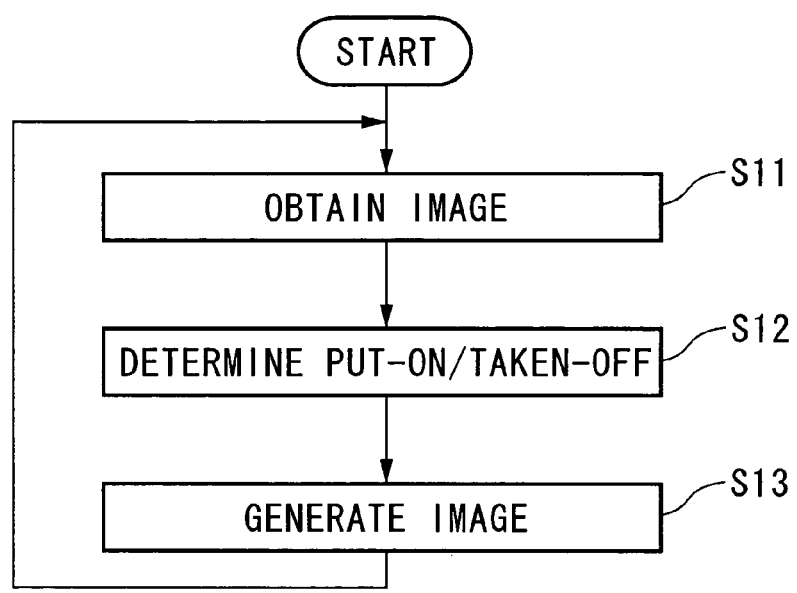
FIG. 12 is a flowchart illustrating operations of the stereoscopic image display system according to the first embodiment of the second aspect of the present invention.

As shown in FIG. 12, in the operations of the stereoscopic image display system 201, a plurality of images is obtained by the infrared camera 227 (Step S11). Here, the infrared camera 227 is for detecting infrared light, so that the image is obtained by visualizing the infrared light emitted from the infrared LED 226 and reflected by the retroreflector 204 disposed on the glasses 203.

Then, after the plurality of images are obtained, the determination section 221 determines whether the glasses 203 are put on or taken off in accordance with the image pickup result (image) of the infrared camera 227 (Step S12).

Specifically, the determination section 221 detects the movement of the retroreflector 204 from the plurality of images obtained from the infrared camera 227, and determines that the glasses 203 in a taken-off condition when movement of the retroreflector 204 is not detected for a predetermined period of time.

Furthermore, the determination section 221 detects the movement of the retroreflector 204 from the plurality of images obtained from the infrared camera 227, and determines that the glasses 203 in a put-on condition when the movement of the retroreflector 204 is detected within the predetermined period of time.

Next, in the operations of the stereoscopic image display system 201 of the first embodiment, the image generation section 223 generates the parallax image or either of the right eye image and the left eye image of the parallax image in accordance with the determination result of the determination section 221 (Step S13).

For example, when it is determined that the glasses 203 are worn in Step S12, the image generation section 223 generates the right eye image and the left eye image by selecting the appropriate data from the pre-stored 3D data.

Figure 13A:
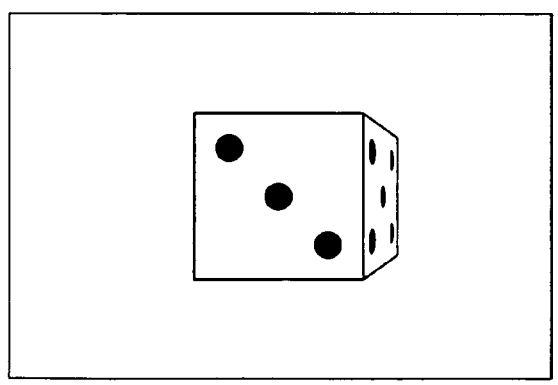
FIGS. 13A and 13B are diagrams illustrating the operations of the stereoscopic image display system according to the first embodiment of the second aspect of the present invention.
Figure 13B:
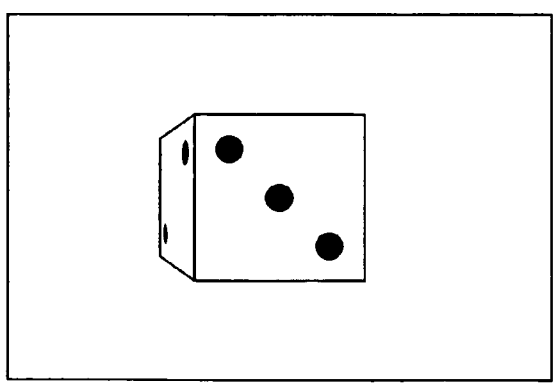

More specifically, in the case in which the image of a die is displayed, for example, the image data of the die as shown in FIG. 13A identical to the image viewed by the right eye is selected as the right eye image, while the image data of the die as shown in FIG. 13B identical to the image viewed by the left eye is selected as the left eye image.

Then, after the left eye image data and the right eye image data of the parallax image generated by the image generation section 223 are input into the projector 224 for the left eye image and the projector 225 for the right eye image, respectively, the left eye image is projected on the screen 228 from the projector 224 for the left eye image and the right eye image is projected on the screen 228 from the projector 225 for the right eye.

Here, the image light of the left eye image projected on the screen 228 from the projector 424 for the left eye image is transformed at the circular polarizing plate 441 into polarized light having a left rotational direction as seen from the image display apparatus 202 in the direction to the glasses 203, while the image light of the right eye image projected from the projector 225 for the right eye image is transformed at the circular polarizing plate 451 into polarized light having a right rotational direction as seen from the image display apparatus 202 in the direction to the glasses 203.

In the glasses 203 of the stereoscopic image display system 201 of the first embodiment, the transmission portion 231 for the right eye is configured for the circular polarizing plate transmitting only circularly polarized light in the right rotational direction as seen from the image display apparatus 202 in the direction to the glasses 203, while the transmission portion 232 for the left eye is configured for the circular polarizing plate transmitting only circularly polarized light in the left rotational direction as seen from the image display apparatus 202 in the direction to the glasses 203, and thereby the right eye image reaches only the right eye of the viewer and the left eye image reaches only the left eye of the viewer. As a result, the brain of the viewer combines the right eye image and the left eye image so that the image is recognized as the 3D image by the viewer.

Moreover, when it is determined that the glasses 203 are taken off in Step S12, the image generation section 223 generates only either of the right eye image and the left eye image by selecting the appropriate data from the pre-stored 3D data.

For example, in generating only the right eye image, the image data of the die as shown in FIG. 13A identical to the image viewed by the right eye is selected as the right eye image to generate only the right eye image. Then, the right eye image data generated by the image generation section 223 is input into the projector 225 for the right eye image, and thereby only the right eye image is projected on the screen 228 from the projector 225 for the right eye image.

In contrast, in generating only the left eye image, the image data of the die as shown in FIG. 13B identical to the image viewed by the left eye is selected as the left eye image to generate only the left eye image. Then, the left eye image data generated by the image generation section 223 is input into the projector 225 for the left eye image, thereby only the left eye image is projected on the screen 228 from the projector 225 for the left eye image.

As described, in the condition in which the glasses 203 are determined to be taken off by the determination section 221, the viewer has taken off the glasses 203. Therefore, the right eye image and the left eye image on the screen 208 would reach both eyes of the viewer, but in the stereoscopic image display system 201 of the first embodiment, only either of the right eye image and the left eye image of the parallax image is displayed when it is determined that the glasses 203 have been taken off, and thereby a 2D image is displayed.

After completing a series of such routines, the operation of the stereoscopic image display system 201 of the first embodiment returns to Step S11.

As described, in the stereoscopic image display system 201 of the first embodiment, the put-on/taken-off determination unit (the determination section 221, the infrared LED 226, the infrared camera 227, and the retroreflector 204) automatically switches over between 3D display and 2D display in accordance with whether the glasses 203 are put on or taken off, and thereby preferred display conditions for the viewer can be realized without requiring viewer's intervention and regardless of whether the glasses are in the put-on condition or in the taken-off condition.

Moreover, in the stereoscopic image display system 201 of the first embodiment, only the retroreflector 204 is disposed on the glasses 203 side as the member for determining whether the glasses 203 are put on or taken off, resulting in whether the glasses 203 are put on or taken off being able to be determined without disposing a device such as a power source on the glasses 203 while the weight of the glasses 203 is not substantially increased.

Furthermore, in the stereoscopic image display system 201 of the first embodiment, infrared light is used to determine whether the glasses 203 are put on or taken off, and thereby whether the glasses 203 are put on or taken off can be determined without affecting the parallax image. Although ultraviolet light can be used as the light outside the visible region, using infrared light is preferable in consideration of cost and safety.

Second Embodiment

Next, the second embodiment of the second aspect of the present invention will be described. The second embodiment differs from the first embodiment only in the method for the put-on/taken-off determination of the glasses 203. Therefore, in the description of the second embodiment, descriptions regarding parts shared with the first embodiment have been omitted or simplified.

In the stereoscopic image display system of the second embodiment, the operation in Step S12 differs from that in the stereoscopic image display system of the first embodiment.

Specifically, the determination section 221 of the stereoscopic image display system of the second embodiment, in Step S12, detects the inclination of the glasses 203 from the image obtained in Step S11 and determines whether the glasses 203 are put on or taken off based on the detected inclination of the glasses 203.

More specifically, the determination section 221 calculates the inclination of the glasses 203 by calculating the coordinates of the respective retroreflectors 241 to 243 to calculate the relative positional relationship of the retroreflectors 241 to 243 and comparing the coordinates with those of the pre-stored retroreflectors.

For example, in the case in which the coordinates of the pre-stored retroreflectors are those for the condition in which the glasses 203 are in a horizontal position, the retroreflectors in a horizontal position and the retroreflectors of the image are compared to calculate the magnitude of the angular displacement and the rotation direction of the glasses 203 at present.

Moreover, the determination section 221 determines that the glasses 203 in a taken-off condition when the inclination of the glasses 203 deviates from the predetermined range.

Furthermore, the determination section 221 determines that the glasses 203 in a put-on condition when the inclination of the glasses 203 is within the predetermined range.

Such a stereoscopic image display system of the second embodiment can also achieve effects similar to those of the stereoscopic image display system of the foregoing first embodiment.

Third Embodiment

Next, the third embodiment of the second aspect of the present invention will be described. The third embodiment also differs from the first embodiment only in the method for the put-on/taken-off determination of the glasses 203. Therefore, in the description of the third embodiment as well, descriptions regarding parts shared with the first embodiment have been omitted or simplified.

In the stereoscopic image display system of the third embodiment, the operation in Step S12 differs from that in the stereoscopic image display system of the first embodiment.

Specifically, the determination section 221 of the stereoscopic image display system of the second embodiment, in Step S12, detects the position of the irises of the viewer from the image obtained in Step S11 and determines whether the glasses 203 are put on or taken off based on the detected position of the irises.

Since the irises of a human reflect light in the direction of its incidence as the retroreflector does, the infrared light emitted from the infrared LED 226 is reflected by the irises of the viewer. Therefore, the irises of the viewer are seen in the image obtained by the infrared camera 227. When the viewer wears the glasses 203, the infrared light reflected by the irises of the viewer is shielded by the transmission portion 231 for the right eye and the transmission portion 232 for the left eye configured as the circular polarizing plates, and thereby the irises of the viewer are not seen in the image. However, when the viewer puts on/off the glasses 203, irises of the viewer are seen in the vicinity of the retroreflector 204 in the image.

In the third embodiment, for example, when the irises of both eyes are viewed in the image at a position away from a center-of-gravity point of the retroreflectors 241 to 243 by 10 cm (a predetermined distance) or more, the determination section 221 determines that the glasses 203 in a taken-off condition and maintains the determination. Moreover, in the condition in which the glasses 203 are determined to be in the taken-off condition, when the irises of both eyes are viewed in the image at a position within 10 cm from the center-of-gravity point of the retroreflectors 241 to 243, it is determined that the glasses 203 are worn and the determination is maintained.

Here, as the infrared LED 226 of the stereoscopic image display system of the third embodiment, it is preferable to use one emitting near-infrared light. Since the near-infrared light has the characteristic that the reflectance is low at the pupils of a human while the reflectance is high at the irises, the identification of the irises can be performed more reliably using an infrared LED 226 emitting near-infrared light.

Such a stereoscopic image display system of the third embodiment can also achieve similar to those of effects as the stereoscopic image display system of the foregoing first embodiment.

Here, whether the glasses 203 are put on or taken off can also be determined with a combination of the first to third embodiments.

Fourth Embodiment

Next, the fourth embodiment of the second aspect of the present invention will be described with reference to FIG. 14. In the description of the fourth embodiment, descriptions regarding parts shared with the first embodiment have been omitted or simplified.

FIG. 14 is a diagram illustrating an internal configuration of an image display apparatus 250 and glasses 260 of the stereoscopic image display system 230 according to the fourth embodiment. As shown in this figure, the image display apparatus 250 is provided with only one projector 251, and a circular polarizing plate is not disposed at the rear of the projector 251. Moreover, the image generation section 223 and the infrared LED 226 are connected.

The glasses 260 are liquid crystal shutter glasses in which modes of a transmission portion 261 for the right eye and a transmission portion 262 for the left eye are changed between the transmitting mode and the non-transmitting mode alternately, configured so that a transmitting mode and a non-transmitting mode are switched between in response to infrared light.

Moreover, in such a configured stereoscopic image display system 230 of the fourth embodiment, the image generation section 223 generates the right eye image and the left eye image alternately and the image is input as the image data into the projector 251. Therefore, the right eye image and the left eye image are displayed on the screen 228 alternately.

Furthermore, the image generation section 223 outputs a pulse signal at the timing of generation of the right eye image and the left eye image, the pulse signal being input into the infrared LED 226. The infrared LED 226 in turn emits the infrared light in response to the pulse signal being input.

Here, in the stereoscopic image display system 230 of the fourth embodiment, it is configured so that the modes of the transmission portion 261 for the right eye and the transmission portion 262 for the left eye of the glasses 260 are changed between the transmitting mode and the non-transmitting mode alternately and so that the transmitting and non-transmitting modes are switched between in response to infrared light. Therefore, the right eye image is displayed on the screen 228 when the transmission portion 261 for the right eye is in the transmitting mode and the transmission portion 262 for the left eye is in the non-transmitting mode, while the left eye image is displayed on the screen 228 when the transmission portion 261 for the right eye is in the non-transmitting mode and the transmission portion 262 for the left eye is in the transmitting mode. Thus, the right eye image reaches only the right eye of the viewer and the left eye image reaches only the left eye of the viewer. As a result, the brain of the viewer combines the right eye image and the left eye image so that the image is recognized as a 3D image by the viewer.

In the stereoscopic image display system 230 of the fourth embodiment, only either of the right eye image and the left eye image is also displayed when the determination section 221 determines that the glasses 203 in a taken-off condition, as in the first embodiment. Here, when the determination section 221 determines that the glasses 203 in a taken-off condition, the image generation section 223 provides the pulse signal to the infrared LED 226 at a predetermined interval.

Such a stereoscopic image display system 230 of the fourth embodiment can also achieve effects similar to those of the stereoscopic image display system 201 of the foregoing first embodiment.

Here, a method for switching between the transmitting mode and the non-transmitting mode in the transmission portion 261 for the right eye and the transmission portion 262 for the left eye is not limited to that described above, and any method can be applied as long as the transmission portion 261 for the right eye is in the transmitting mode upon the right eye image being displayed on the screen 228 while the transmission portion 262 for the left eye is in the transmitting mode upon the left eye image being displayed on the screen 228.

While preferred embodiments of the stereoscopic image display system according to the present invention have been described with reference to the accompanying drawings, it is obvious that the present invention is not limited to the foregoing embodiments. Various shapes or combinations of the respective components of the foregoing embodiments are shown merely by way of example, and various changes and modifications are possible based on design requirements without departing from the scope of the present invention.

For example, while a projector is used as the display unit in the foregoing embodiments, the present invention is not limited thereto and various display devices such as a CRT, a liquid crystal display device, a plasma display panel, an organic electroluminescence (EL) display device, an inorganic EL display device, a field emission display, or a surface-conduction electron emitter display can be used.

What is claimed is:
1. A stereoscopic image display system comprising:
an image display unit that displays a parallax image composed of a right eye image and a left eye image;
a transmission portion for a right eye transmitting only the right eye image of the parallax image and a transmission portion for a left eye transmitting only the left eye image of the parallax image;
a put-on/taken-off determination unit that determines whether glasses are put on or taken off; and
an image generation unit that generates the parallax image when it is determined that the glasses are in a put-on condition by the put-on/taken-off determination unit, and generates only either of the right eye image and the left eye image of the parallax image when it is determined that the glasses are in a taken-off condition by the put-on/taken-off determination unit, wherein
the put-on/taken-off determination unit comprises:
an invisible light emission unit that emits light outside the visible region and a light reception unit for receiving the light, the invisible light emission unit and the light reception unit being disposed on the image display unit;
at least three retroreflectors disposed on the glasses, at least one of which is disposed off a straight line; and
a determination unit that calculates an inclination of the glasses, wherein
the determination unit includes a pre-stored relative positional relationship of the at least three retroreflectors;
the light reception unit obtains a plurality of images visualizing light reflected by the at least three retroreflectors;
the determination unit calculates a calculated relative positional relationship of the at least three retroreflectors from the plurality of images;
the determination unit calculates an inclination of the glasses by comparing the calculated relative positional relationship of the at least three retroreflectors with the pre-stored relative positional relationship of the at least three retroreflectors; and
the determination unit determines that the glasses are in the taken-off condition when the inclination of the glasses deviates from a predetermined range, and determines that the glasses are in the put-on condition when the inclination of the glasses is within the predetermined range.

2. The stereoscopic image display system according to claim 1, wherein the determination unit detects a movement of the retroreflector from the light reception result and determines that the glasses are taken off when the movement of the retroreflector is not detected for a predetermined period of time.

3. The stereoscopic image display system according to claim 1, wherein the determination unit determines that the glasses are in the taken-off condition when irises of a viewer are recognized at a position away from the retroreflector by more than a predetermined distance.

4. The stereoscopic image display system according to claim 1, wherein the glasses are circular polarizing glasses that transmit circularly polarized light with different rotation angles for the transmission portion for the right eye and the transmission portion for the left eye.

5. The stereoscopic image display system according to claim 1, wherein the glasses are liquid crystal shutter glasses in which states of the transmission portion for the right eye and the transmission portion for the left eye are changed between a transmitting mode and a non-transmitting mode alternately.

6. The stereoscopic image display system according to claim 1, wherein the invisible light emission unit is an infrared LED (Light Emitting Diode) and the light reception unit is an infrared camera.

7. The stereoscopic image display system according to claim 1, wherein the display unit is a projector.

8. The stereoscopic image display system according to claim 1, wherein the light reception unit obtains a plurality of images and the determination unit detects the movement of the retroreflector from the plurality of images.

* * * * *